United States Patent
Nguyen

(10) Patent No.: US 8,046,272 B1
(45) Date of Patent: Oct. 25, 2011

(54) SYSTEMS AND METHODS FOR FACILITATING REAL-TIME PRODUCT INQUIRIES DURING ONLINE SHOPPING

(75) Inventor: Laurent An Minh Nguyen, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 860 days.

(21) Appl. No.: 12/015,992

(22) Filed: Jan. 17, 2008

(51) Int. Cl.
*G06Q 30/00* (2006.01)

(52) U.S. Cl. .............. 705/26.7; 705/26.1; 705/26.41

(58) Field of Classification Search .......... 705/14, 705/26.1, 26.41, 26.7
See application file for complete search history.

(56) References Cited

U.S. PATENT DOCUMENTS

| | | | |
|---|---|---|---|
| 6,631,184 B1 * | 10/2003 | Weiner | 379/92.01 |
| 6,771,766 B1 * | 8/2004 | Shafiee et al. | 379/265.09 |
| 6,901,379 B1 * | 5/2005 | Balter et al. | 705/27 |
| 6,963,848 B1 * | 11/2005 | Brinkerhoff | 705/10 |
| 6,976,056 B1 * | 12/2005 | Kumar | 709/206 |
| 7,389,285 B2 * | 6/2008 | Barry et al. | 1/1 |
| 7,395,224 B1 * | 7/2008 | Todd | 705/26.43 |
| 7,395,227 B2 * | 7/2008 | Todd | 705/26.43 |
| 7,398,230 B2 * | 7/2008 | Todd | 705/26.43 |
| 7,412,410 B2 * | 8/2008 | Todd | 705/26.41 |
| 7,433,832 B1 * | 10/2008 | Bezos et al. | 705/26 |
| 7,526,440 B2 * | 4/2009 | Walker et al. | 705/26 |
| 7,769,642 B2 * | 8/2010 | Todd | 705/26.1 |
| 2002/0042733 A1 * | 4/2002 | Lesandrini et al. | 705/10 |
| 2002/0147625 A1 * | 10/2002 | Kolke, Jr. | 705/9 |
| 2002/0147633 A1 * | 10/2002 | Rafizadeh | 705/14 |
| 2003/0046689 A1 * | 3/2003 | Gaos | 725/34 |
| 2003/0167195 A1 * | 9/2003 | Fernandes et al. | 705/8 |
| 2004/0117253 A1 * | 6/2004 | Tsushi | 705/14 |
| 2004/0243527 A1 * | 12/2004 | Gross | 705/500 |
| 2005/0027612 A1 * | 2/2005 | Walker et al. | 705/26 |
| 2005/0165832 A1 * | 7/2005 | Adam Barry et al. | 707/103 R |
| 2006/0229936 A1 * | 10/2006 | Cahill | 705/14 |
| 2007/0077944 A1 * | 4/2007 | Bellenger et al. | 455/456.1 |
| 2007/0239560 A1 * | 10/2007 | McGuire et al. | 705/26 |
| 2008/0059297 A1 * | 3/2008 | Vallier et al. | 705/14 |
| 2008/0091509 A1 * | 4/2008 | Campbell et al. | 705/10 |
| 2008/0208663 A1 * | 8/2008 | Walker et al. | 705/7 |
| 2008/0320004 A1 * | 12/2008 | Jain et al. | 707/10 |
| 2009/0018912 A1 * | 1/2009 | Altberg et al. | 705/14 |
| 2009/0157559 A1 * | 6/2009 | Wu et al. | 705/80 |
| 2009/0187455 A1 * | 7/2009 | Fernandes et al. | 705/9 |
| 2010/0208028 A1 * | 8/2010 | Lauffer | 348/14.01 |

OTHER PUBLICATIONS

"Bank of America Live Chat," https://sec1.liveperson.net/hc/LPBofA1/?cmd=file&file=visitorWantsToChat&site=LPBofA1&SV!chat-button-name=chat-deposits&SV!chat-button-room=chat-deposits&referrer=(button%20dynamic-button:chat-deposits(Checking%20Account%20Overview%3A%20Open%20a%20Checking%20Account%20Online%20from%20Bank%20of%20America))%20http%3A//www.bankofamerica.com/deposits/checksave/&x, Jan. 5, 2009.

"Apple Support Discussions" http://discussions.apple.com/thread.jspa?threadID=1607494&tstart=0, Jan. 5, 2009.

* cited by examiner

*Primary Examiner* — Jagdish Patel
*Assistant Examiner* — Kenneth Bartley
(74) *Attorney, Agent, or Firm* — Lee & Hayes, PLLC

(57) ABSTRACT

In accordance with a method for facilitating real-time product inquiries during online shopping, a request may be received from a potential buyer of a product for real-time inquiry about the product. In response, a previous customer of the product who has enrolled to participate in a real-time inquiry program may be identified. Real-time communication may be established with the previous customer.

28 Claims, 8 Drawing Sheets

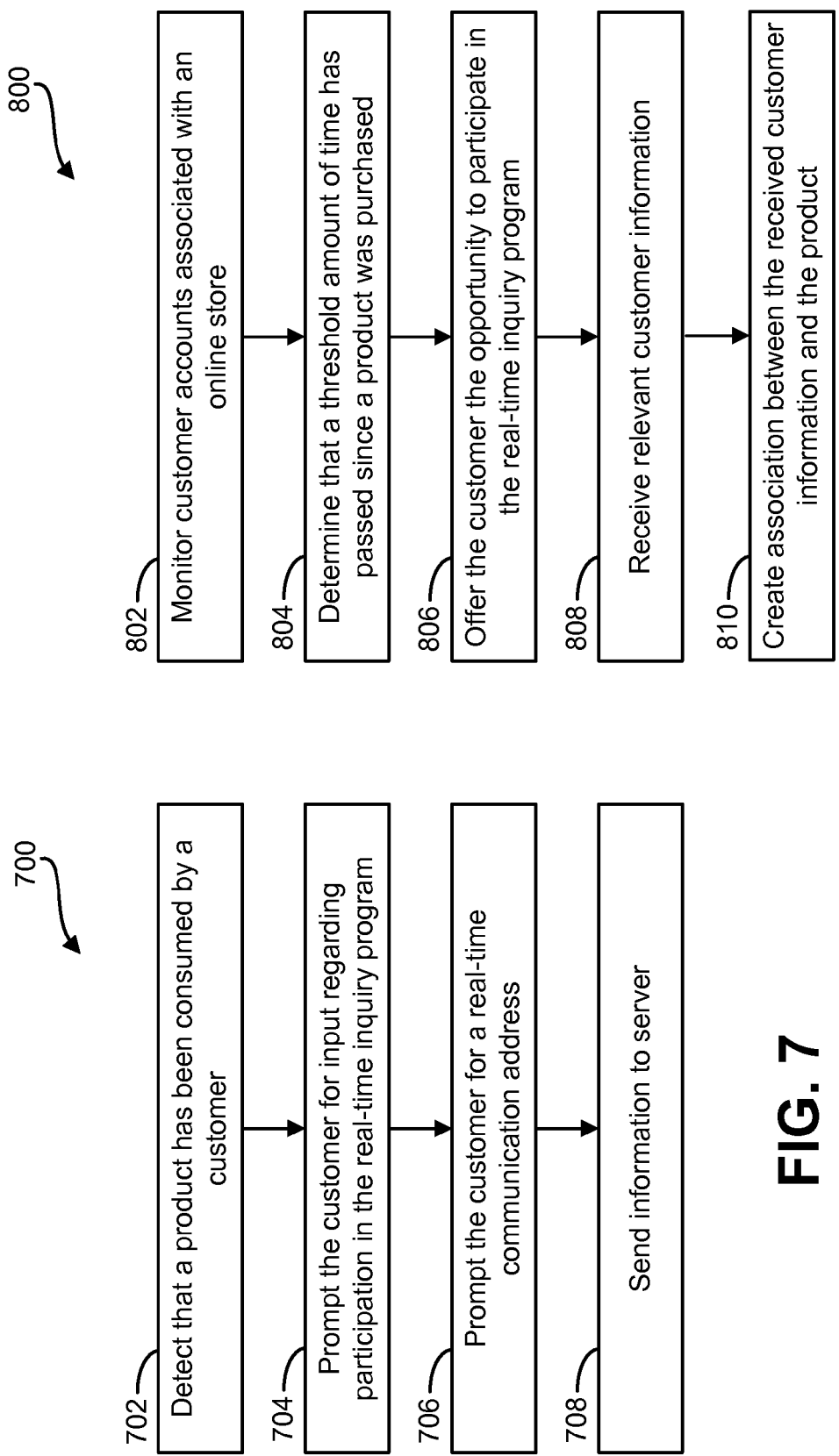

SYSTEMS AND METHODS FOR FACILITATING REAL-TIME PRODUCT INQUIRIES DURING ONLINE SHOPPING

TECHNICAL FIELD

The present disclosure relates generally to computers and computer-related technologies. More specifically, the present disclosure relates to systems and methods for facilitating real-time product inquiries during online shopping.

BACKGROUND

Many retailers have set up Internet web sites where consumers can shop for various products that are available for sale, purchase the desired products and have the products delivered to them. The term "online shopping" refers to the process of purchasing products over the Internet. The term "online merchant" may refer to a merchant that has set up an Internet web site through which products may be ordered.

Consumers may purchase a wide variety of products via online shopping. Some examples of products that may be purchased include tangible goods such as books, CDs, DVDs, tools, clothes, footwear, health/beauty items, hardware, groceries, or the like. Other examples of products that may be purchased via online shopping include "digital" goods, such as electronic books, music, movies/videos, application software, or the like.

An online merchant's web site may provide a wide variety of information about the products that are offered for sale. Such information may include images of the products, product descriptions, price, availability, customer reviews, etc.

An online merchant may offer products for sale that are manufactured by the merchant itself. Alternatively, or in addition, an online merchant may offer products for sale that are manufactured by or obtained from one or more third-party vendors.

A consumer may use a web browser on his/her computer to order products from an online merchant's web site. When products are ordered, the consumer may provide some type of payment information (e.g., a credit card number). The payment information may be encrypted as it is transferred from the consumer's computer to the merchant's server (or to a third-party payment server). Once the payment information has been received and verified, the products may be shipped to the consumer's address, downloaded to the consumer's computer, or made available for in-store pickup as appropriate.

Online shopping is popular for a variety of reasons, including its speed and ease of use. In view of the popularity of online shopping, benefits may be realized from improvements that are related to improving a consumer's online shopping experience.

BRIEF DESCRIPTION OF THE DRAWINGS

FIG. 7 illustrates a method for enrolling customers in a real-time inquiry program;

FIG. 8 illustrates another method for enrolling customers in a real-time inquiry program.

DETAILED DESCRIPTION

Figure 1:
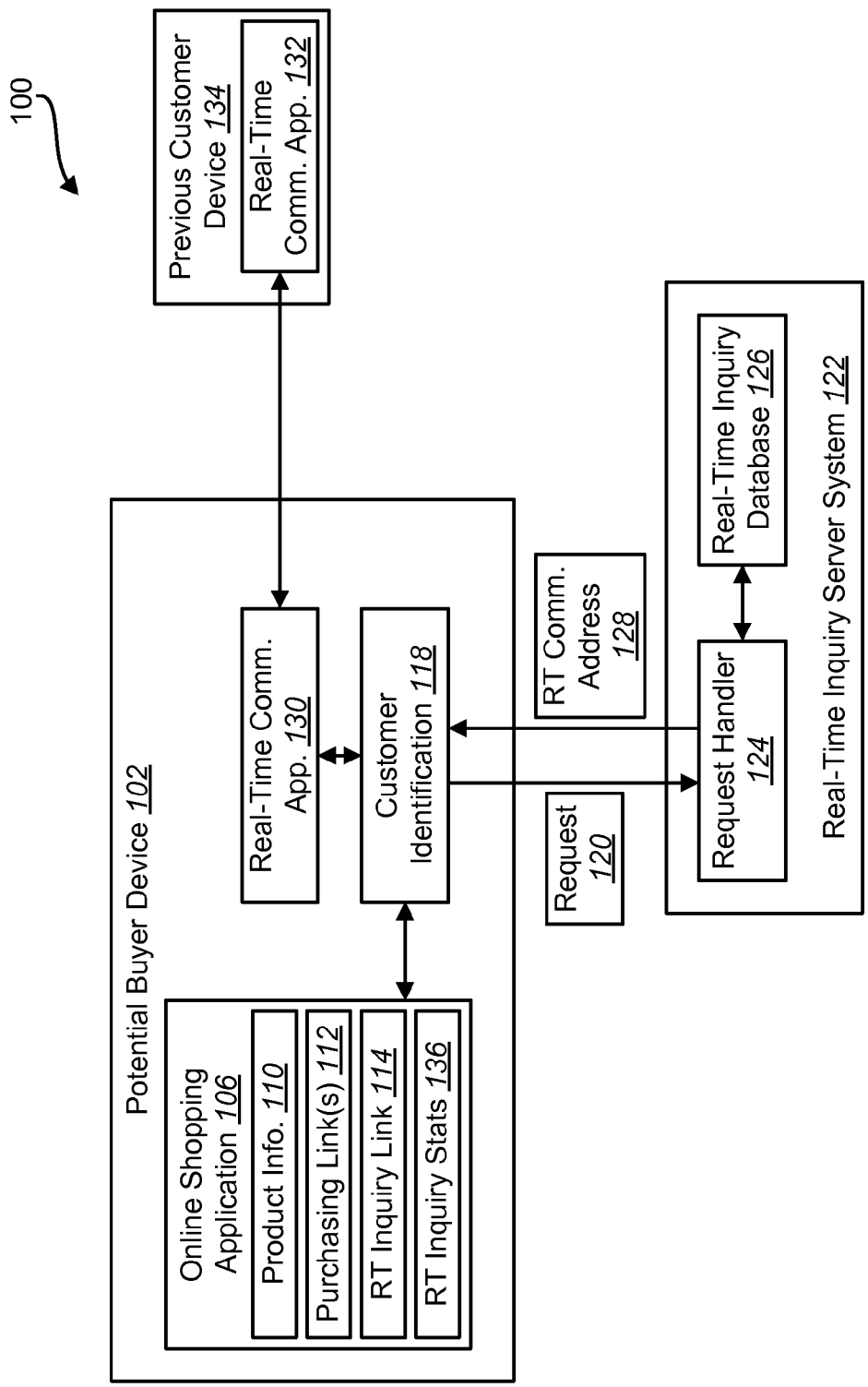
FIG. 1 illustrates a system for facilitating real-time product inquiries.

A method for facilitating real-time product inquiries during online shopping is disclosed. In accordance with the method, a request may be received from a potential buyer of a product for real-time inquiry about the product. In response, a previous customer of the product who has enrolled to participate in a real-time inquiry program may be identified. Real-time communication may then be established with the previous customer.

The method may also include determining that a commitment period for which the previous customer has committed to answering questions about the product has not expired. The method may also include determining that the previous customer is currently online.

The method may also include determining that a product has been used by a previous customer. In response, the previous customer may be prompted for input regarding participation in the real-time inquiry program.

The method may also include determining that a threshold amount of time has passed since a product was purchased by the previous customer. In response, the previous customer may be contacted regarding participation in the real-time inquiry program.

The method may also include displaying statistics about how many previous customers are currently available for real-time communication. The method may also include providing rewards for customer participation in the real-time inquiry program.

Establishing real-time communication may include communicating with a communication bridge. The communication bridge may bridge communication between a real-time communication application on a potential buyer device and the real-time communication application used by the previous customer.

A computer system that is configured to facilitate real-time product inquiries during online shopping is also disclosed. The computer system includes a processor and memory in electronic communication with the processor. Instructions may be stored in the memory. The instructions may be executable to receive a request from a potential buyer of a product for real-time inquiry about the product. The instructions may also be executable to identify a previous customer of the product who has enrolled to participate in a real-time inquiry program. The instructions may also be executable to establish real-time communication with the previous customer.

A computer-readable medium is also disclosed. The computer-readable medium may include executable instructions for receiving a request from a potential buyer of a product for real-time inquiry about the product. The computer-readable medium may also include executable instructions for identifying a previous customer of the product who has enrolled to participate in a real-time inquiry program. The computer-readable medium may also include executable instructions for establishing real-time communication with the previous customer.

A computer system that is configured to facilitate real-time product inquiries during online shopping is also disclosed.

The computer system may include means for receiving a request from a potential buyer of a product for real-time inquiry about the product. The computer system may also include means for identifying a previous customer of the product who has enrolled to participate in a real-time inquiry program. The computer system may also include means for establishing real-time communication with the previous customer.

As indicated above, the present disclosure relates generally to improving a consumer's online shopping experience. Before deciding whether to purchase a particular product while shopping online, a potential buyer may want to gather as much information as possible about the product. The product information that is displayed on some online merchants' web sites may include product descriptions, pictures, customer reviews and ratings, and so forth. However, certain information that the potential buyer wants to find out before making a purchasing decision may not be available.

One aspect of the present disclosure relates to facilitating real-time product inquiries during online shopping. For example, while shopping online, a potential buyer of a product may be permitted to ask questions about the product and receive immediate (or nearly immediate) answers to those questions from individuals that are knowledgeable about the product, such as previous customers of the product. Such real-time product inquiries may occur via real-time communication applications, such as instant messaging applications (sometimes referred to as chat applications).

A potential buyer may initiate real-time inquiries about a product by, for example, clicking on a link that is associated with the product. In response, the potential buyer may be placed in real-time communication with a previous customer of the product who has enrolled in the online merchant's real-time inquiry program. The potential buyer may then ask the previous customer questions about the product. In this way, the potential buyer may be able to find out information that is not included among the product descriptions and other materials that are available online. In addition, this information may be made available to the potential buyer on an immediate (or nearly immediate) basis.

The potential buyer may initiate real-time product inquiries using virtually any type of computing device. Some examples of computing devices that may be used include a personal computer, a laptop computer, a personal digital assistant, a smartphone, an electronic book (e-book) reader, etc. A computing device that is used by a potential buyer for online shopping may be referred to herein as a potential buyer device.

Real-time product inquiries may be initiated using virtually any type of online shopping application. Examples of online shopping applications include online merchant websites that may be viewed via a web browser, online stores whose storefronts may be viewed via a standalone application, etc.

Another aspect of the present disclosure relates to enrolling customers in a real-time inquiry program. It may be desirable to enroll customers who have had at least some experience using a product, in order to increase the likelihood that the customers will be able to provide meaningful information to potential buyers. There are a variety of different ways that such customers may be enrolled.

For example, where the product at issue includes electronic media content (e.g., audio, video, electronic books or periodicals, etc.), it may be possible to detect when the product has been "consumed" (e.g., listened to, viewed, etc.) by a customer. For example, some electronic book readers may be configured to determine when a customer has finished reading an electronic book. Where this functionality is available, a customer may be provided with an opportunity to enroll in a real-time inquiry program immediately upon consuming the purchased media content.

Alternatively, an online merchant may invite a customer to enroll after a threshold amount of time has passed since the customer purchased a product, under the assumption that the customer would probably have used the product within that time period. The threshold time period may be different for different types of products.

A customer may enroll in an online merchant's real-time inquiry program by providing certain information, such as a real-time communication address (e.g., an instant messaging address). A customer may be asked to commit to answer questions about a particular product for a certain period of time, which may be referred to herein as a commitment period. In return, the customer may be provided with one or more rewards, such as other products or product accessories, monetary credits that may be redeemed at the online merchant's store, coupons, money, etc.

A server or a collection of servers may be provided for maintaining information about the customers who have enrolled in an online merchant's real-time inquiry program and for handling requests for such information. The server(s) that is/are provided for this purpose may be referred to herein as a real-time inquiry server system.

When a potential buyer initiates real-time product inquiries, component(s) on the potential buyer device may communicate with the real-time inquiry server system to identify previous customer(s) with which real-time communication may be initiated. When the real-time inquiry server system identifies a previous customer who has enrolled in the real-time inquiry program, who is currently online, and whose commitment period has not expired, the real-time server system may send the real-time communication address for that customer to the potential buyer device. Then, real-time communication may be initiated between a real-time communication application on the potential buyer device and a real-time communication application on a computing device that is being used by the previous customer (which may be referred to herein as a previous customer device).

The real-time communication application on the previous customer device may be integrated into the online shopping application (which, as indicated above, may be a web browser, a store application, etc.). In other words, the real-time communication application on the previous customer device may be configured to cause the online shopping application to display certain information that the previous customer wants the potential buyer to see (e.g., a detail page associated with a particular product that the previous customer is recommending to the potential buyer). This information may be displayed without intervention from the potential buyer. This feature may make it easier for a previous customer to communicate certain things to a potential buyer. For example, this feature may allow a previous customer to recommend a certain product via instant messaging and at the same time make the purchasing application show a detail page that is associated with the product.

Under some circumstances, the real-time communication applications may not be compatible with one other. In this situation, then communication may occur via a communication bridge that may be implemented as part of the real-time inquiry server system.

If the potential buyer is dissatisfied with the information that is provided by the first previous customer that he/she communicates with, then the potential buyer may initiate real-time communication with one or more additional previous customers until the desired information is obtained. The potential buyer may be given the opportunity to provide feedback about the customers that he/she communicates with, and the feedback may be made available to other potential buyers. The feedback may take the form of ratings, whereby a potential buyer is given the opportunity to rate the quality of the responses to his/her inquiries.

Previous customers who participate in the real-time inquiry program may be given rewards under some circumstances. For example, if potential buyers are allowed to provide feedback, previous customers may be rewarded for providing the best responses to inquiries from potential customers (as measured by the feedback from the potential buyers). As another example, previous customers may be rewarded for leading potential buyers to the most purchases during a certain time period (e.g., per month, per quarter, etc.). There are many kinds of rewards that may be provided. Examples of possible rewards include money, monetary credits that may be redeemed at the online merchant's store, discounts, coupons, products or product accessories, etc.

It may be beneficial for an online shopping application to display statistics about how many previous customers are currently available for real-time communication. Such statistics may be displayed for one or more individual products, and/or with respect to entire categories of products. A high number of previous customers available for real-time product inquiries may attract more potential buyers.

Under some circumstances, real-time product inquiries may be initiated with individuals other than previous customers. For example, potential buyers may be given the opportunity to initiate real-time communication with a product's supplier, seller, maker, inventor, author, etc. As another alternative, a previous customer of a particular product may be made available for real-time inquiries about an entire class of related products. For example, a customer who has read the book "Foundation" could be queried about any book within a product category such as "1950-1960 science fiction books" or "books by Isaac Asimov." The system could even be extended to support non-real-time queries, or online forums and online communities of users around a product.

FIG. 1 illustrates a system 100 for facilitating real-time product inquiries. A potential buyer device 102 is shown. A potential buyer may use the potential buyer device 102 to shop for products online.

An online shopping application 106 is shown displaying product information 110 and a purchasing link 112. User activation of the purchasing link 112 may facilitate the purchase of one or more products.

The online shopping application 106 is also shown displaying a real-time inquiry link 114. User activation of the real-time inquiry link 114 may be interpreted as a request for real-time inquiry about a product, i.e., communication in real time with a previous customer of the product (or other individual who is knowledgeable about the product) who has enrolled to participate in an online merchant's real-time inquiry program.

In response to user activation of the real-time inquiry link 114 corresponding to a particular product, a customer identification component 118 on the potential buyer device 102 may send a message 120 to a real-time inquiry server system 122. The message 120 may identify the product at issue, and it may be interpreted as a request 120 for a real-time communication address 128 for a participating previous customer, i.e., a previous customer of the product who has enrolled to participate in the real-time inquiry program. As indicated above, the real-time communication address 128 may be an instant messaging address.

In response to receiving the request 120, a request handler 124 may query a real-time inquiry database 126 to identify a previous customer of the product who has enrolled in the real-time inquiry program, and to determine a real-time communication address 128 that is associated with the previous customer. The request handler 124 may then send the real-time communication address 128 back to the customer identification component 118.

Once the real-time communication address 128 for a previous customer has been received, a real-time communication application 130 on the potential buyer device 102 may then use the real-time communication address 128 to establish real-time communication with the previous customer. The real-time communication application 130 is shown communicating with a real-time communication application 132 on a previous customer device 134. The real-time communication applications 130, 132 may be instant messaging applications.

In addition to the real-time inquiry link 114, the online shopping application 106 is also shown displaying statistics 136 about how many previous customers are currently available for real-time communication. These real-time inquiry statistics 136 may be displayed for one or more individual products, and/or with respect to entire categories of products.

Figure 2:
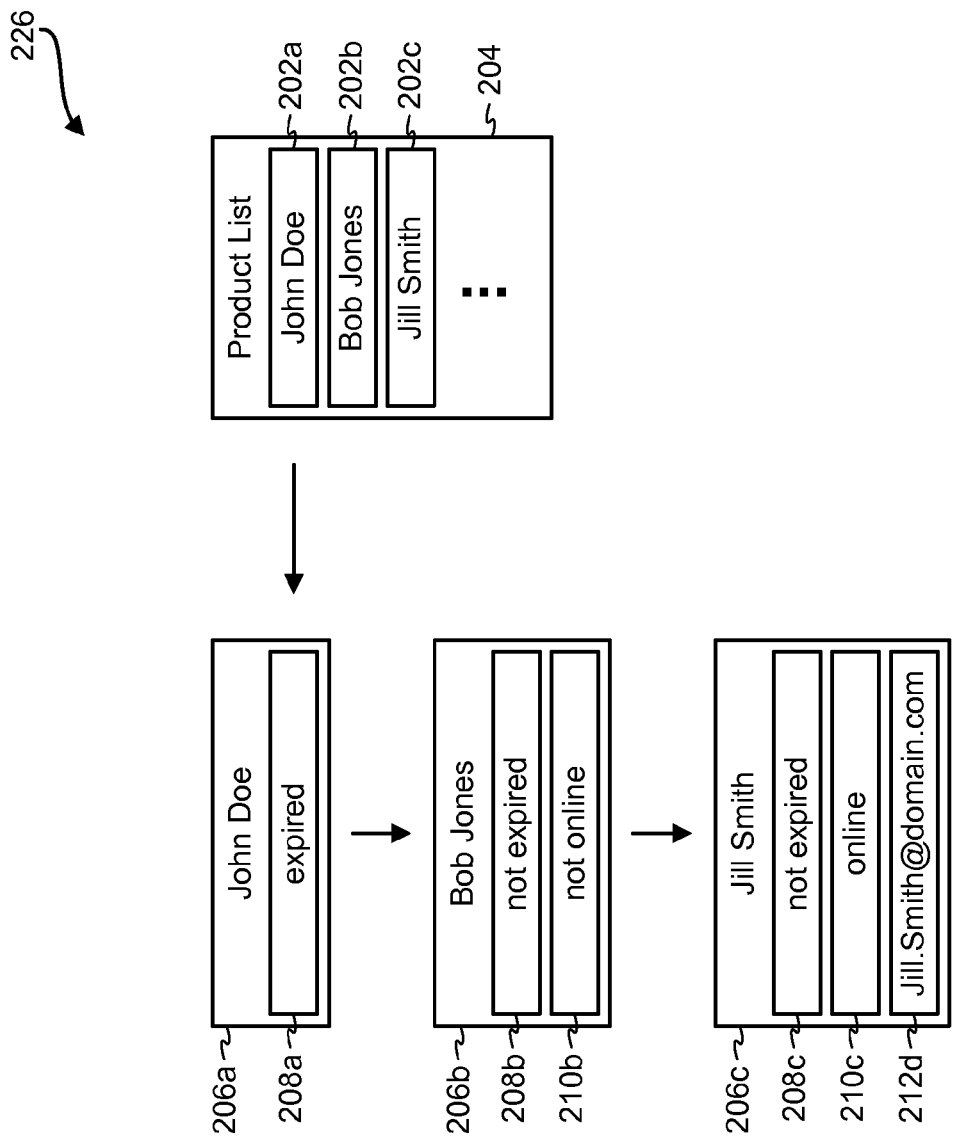
FIG. 2 illustrates how a real-time communication address for a participating previous customer may be identified within a real-time inquiry database.

FIG. 2 illustrates how a real-time communication address 128 for a participating previous customer may be identified within a real-time inquiry database 226. The real-time inquiry database 226 is shown with a list 204 of previous customers for a particular product. This list 204 may include the previous customers 202 of the product (e.g., the customers 202 who have previously used or consumed the product) who have enrolled to participate in an online merchant's real-time inquiry program.

In response to a request 120 from a potential buyer device 102, a record 206a associated with the first customer 202a in the list 204 may be examined. An expiration field 208a may be examined to determine whether the commitment period (i.e., the time period for which the first customer 202a has committed to answering questions about the product) has expired. In the depicted example, the expiration field 208a indicates that the commitment period for the first customer 202a has expired. Because of this, it may be determined that the first customer 202a is not presently available for real-time communication with the potential buyer.

A record 206b associated with the second customer 202b in the list 204 may then be examined. The expiration field 208b in this record 206b may be examined. In the depicted example, the expiration field 208b indicates that the commitment period for the second customer 202b has not expired. Then an online status field 210b may be examined to determine whether the second customer 202b is currently online. In the depicted example, the online status field 210b indicates that the second customer 202b is not currently online. Because of this, it may be determined that the second customer 202b is not presently available for real-time communication with the potential buyer.

A record 206c associated with the third customer 202c in the list 204 may then be examined. The expiration field 208c in this record 206c may be examined. In the depicted example, the expiration field 208c indicates that the commitment period for the third customer 202c has not expired. Then an online status field 210c may be examined to determine whether the third customer 202c is currently online. In the depicted example, the online status field 210c indicates that the third customer 202c is currently online. Therefore, it may be determined that the third customer 202c is presently available for real-time communication with the potential buyer, and a communication address field 212d may be examined to determine the real-time communication address 128 for the third customer 202c. This real-time communication address 128 may be provided in response to the request 120.

Figure 3:
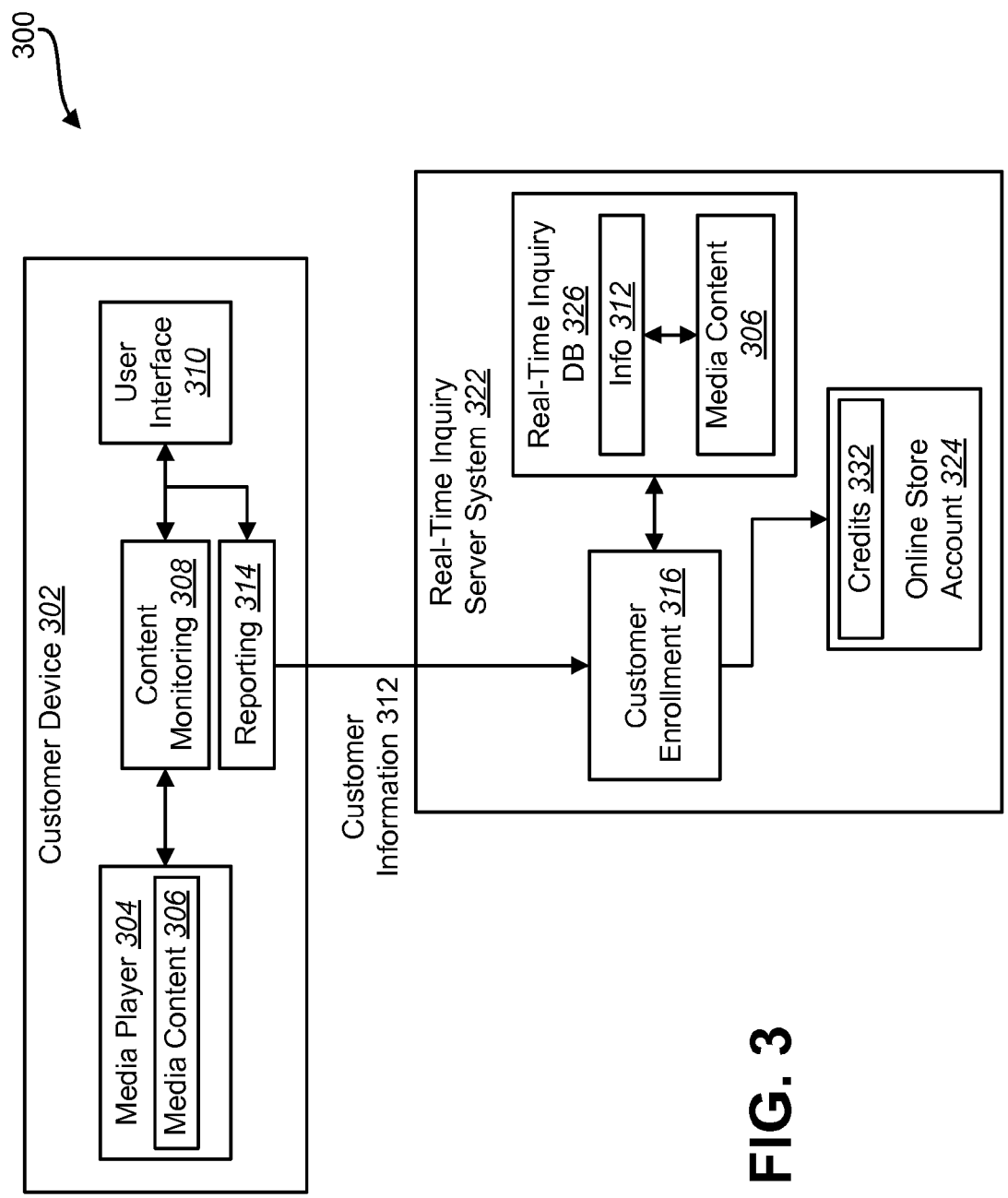
FIG. 3 illustrates a system for enrolling customers in a real-time product inquiry program.

FIG. 3 illustrates a system 300 for enrolling customers in a real-time product inquiry program. A customer device 302 is shown with a media player 304. The media player 304 may be used to play electronic media content 306. Examples of media content 306 include electronic books, electronic periodicals (e.g., newspapers, magazines, etc.), music, videos, etc. The customer device 302 may be a personal computer, a laptop computer, a dedicated electronic book reader, a personal digital assistant, etc. The media content 306 may be purchased via an online store that is maintained by an online merchant.

A content monitoring component 308 may detect when the media player 304 finishes playing the media content 306. In response, the user of the customer device 302 may be prompted for input regarding participation in the real-time inquiry program. For example, a message may be displayed to the user asking the user whether he/she wants to participate in the real-time inquiry program. This may be done via a user interface 310.

If the user answers that he/she does want to participate in the real-time inquiry program, then the user may be prompted for relevant customer information 312. For example, the customer may be asked to provide a real-time communication address 128.

A reporting component 314 may send the customer information 312 to a real-time inquiry server system 322, and more specifically, to a customer enrollment component 316. The customer enrollment component 316 create an association between the customer information 312 and the media content 306. For example, the customer may be added to a list 204 of participating previous customers.

The customer enrollment component 316 is also shown depositing credits 332 into the customer's online store account 324. The credits 332 are an example of rewards that may be provided as an incentive for participation in the real-time inquiry program. Other types of rewards may be provided, such as other products or product accessories, coupons, money, etc.

Figure 4:
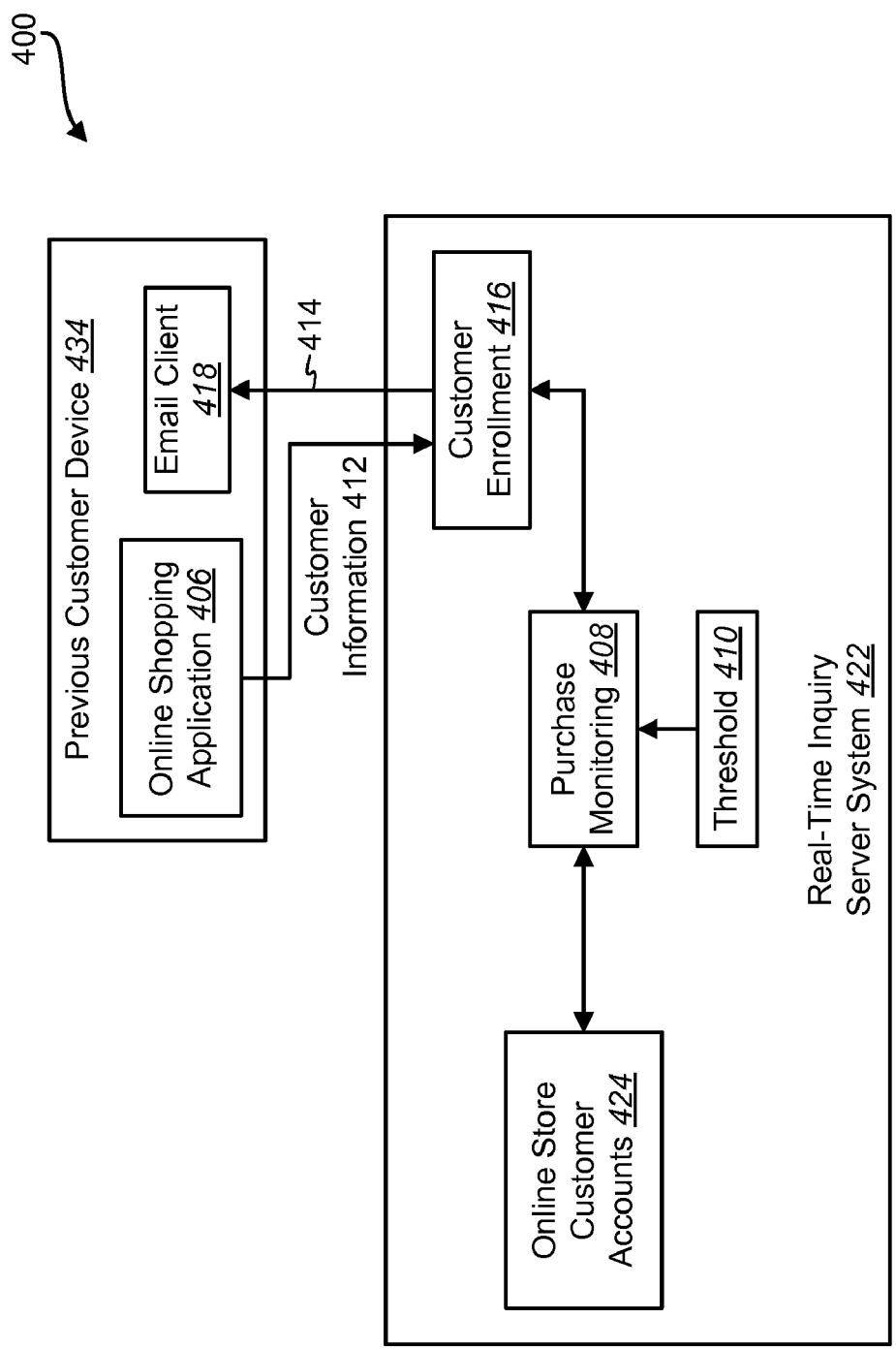
FIG. 4 illustrates another system for enrolling customers in a real-time product inquiry program.

FIG. 4 illustrates another system 400 for enrolling customers in a real-time product inquiry program. A real-time inquiry server system 422 is shown with a purchase monitoring component 408, which may be configured to monitor customer accounts 424 associated with an online store.

Whenever the purchase monitoring component 408 determines that a threshold 410 amount of time has passed since a particular product was purchased, a customer enrollment component 416 may attempt to contact the customer who purchased the product for the purpose of offering the customer the opportunity to participate in the real-time inquiry program. In FIG. 4, the customer enrollment component 416 is shown sending an email message 414 to the customer, which the customer may read using an email client 418 on a previous customer device 434. However, there are many alternative ways that the customer may be contacted, including real-time electronic communication as well as non-electronic communication (e.g., over the telephone, via standard (non-electronic) mail, etc.). Any contact information that was provided when the customer purchased the product may be used for purposes of attempting to contact the customer.

If the customer decides to participate in the real-time inquiry program, the customer may enroll via an online shopping application 406. This may involve navigating to a relevant section of the online shopping application 406 and providing the requested information 412, which may include a real-time communication address 128. However, there are many alternative ways that the customer may enroll in the program, such as over the telephone, via standard (non-electronic) mail, etc.

Figure 5:
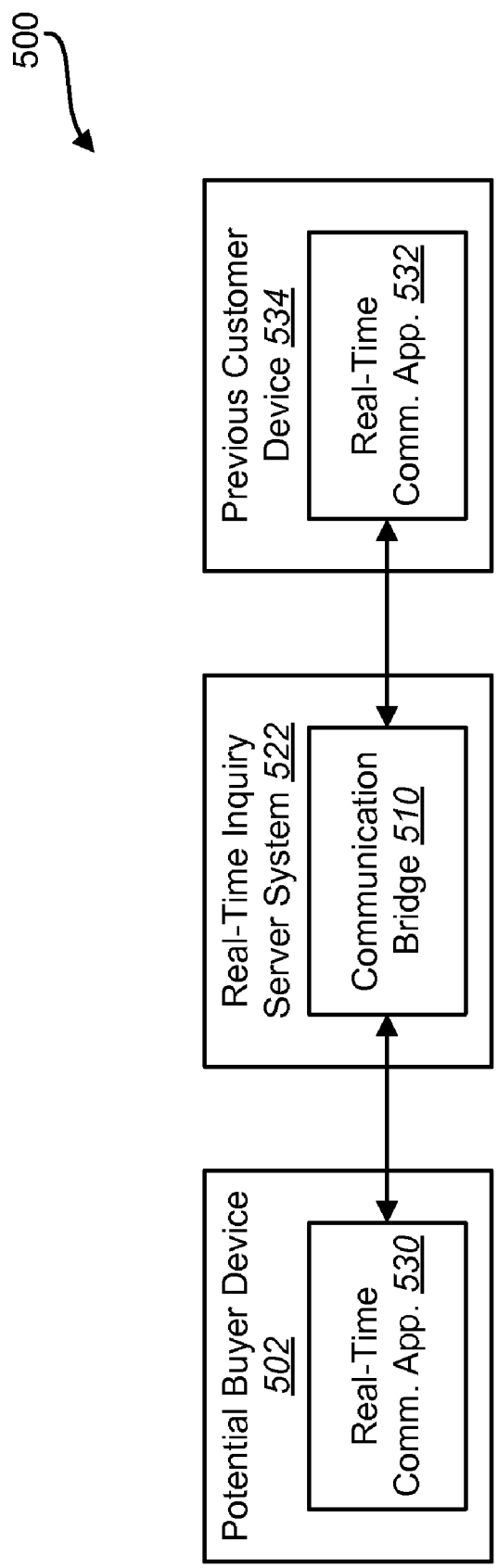
FIG. 5 illustrates how communication may occur between real-time communication applications.

FIG. 5 illustrates how communication may occur between real-time communication applications 530, 532. In particular, a real-time communication application 530 on a potential buyer device 502 is shown communicating with a real-time communication application 532 on a previous customer device 534 via a communication bridge 510.

Communication between the real-time communication applications 530, 532 may occur via the communication bridge 510 if the real-time communication applications 530, 532 are otherwise incompatible with one another. The communication bridge 510 may be configured to convert messages from the real-time communication application 530 on the potential buyer device 502 into a format that is compatible with the real-time communication application 532 on the previous customer device 534, and vice versa. The communication bridge 510 may be implemented as part of a real-time inquiry server system 522.

Figure 6:
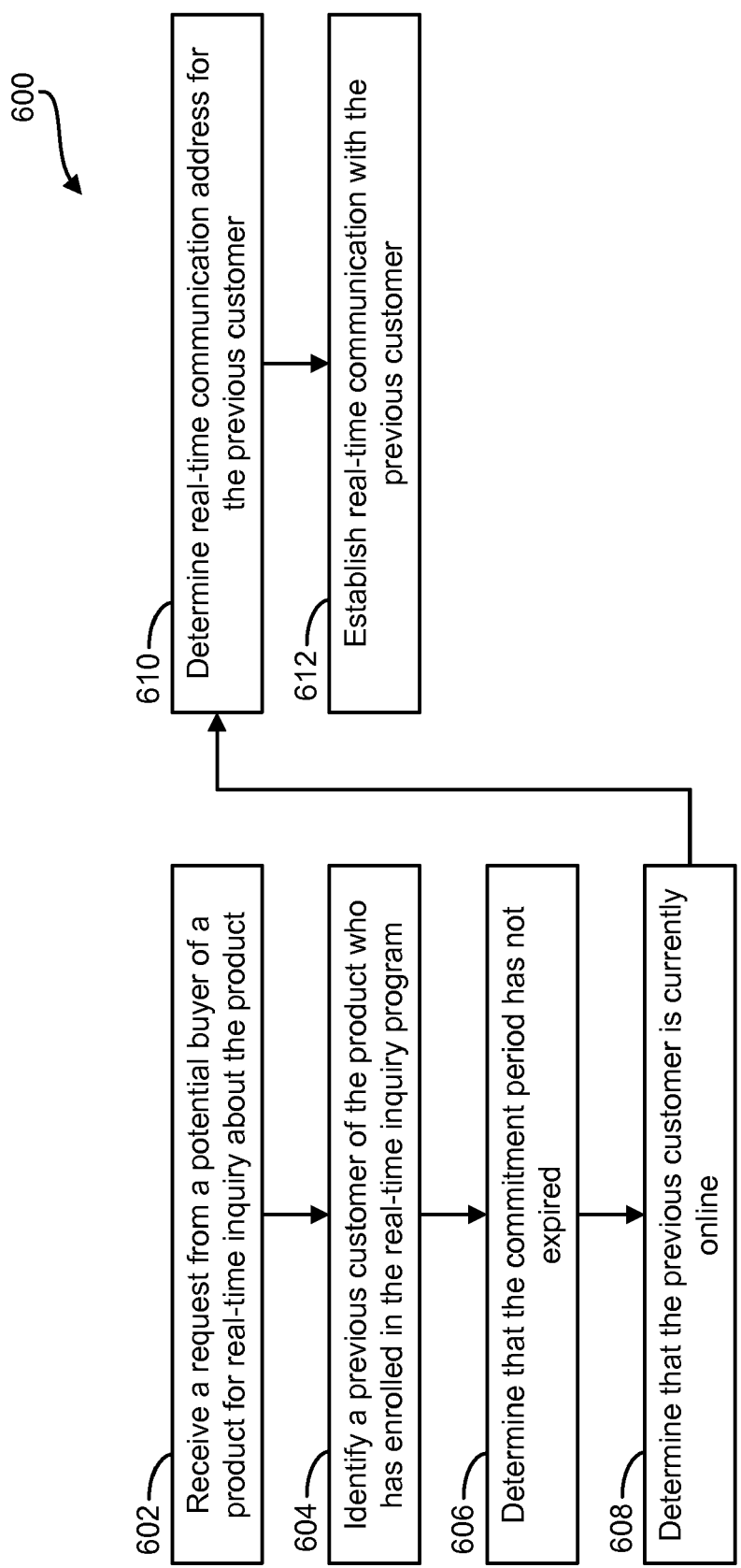
FIG. 6 illustrates a method for facilitating real-time product inquiries.

FIG. 6 illustrates a method 600 for facilitating real-time product inquiries. In accordance with the method 600, a request may be received 602 from a potential buyer of a product for real-time inquiry about the product. The remainder of the method 600 may be performed in response to receiving 602 such a request.

A previous customer of the product who has enrolled in the real-time inquiry program may be identified 604. After determining 606 that the commitment period for which the previous customer has committed to answering questions about the product has not expired, and also determining 608 that the previous customer is currently online, then a real-time communication address 128 for the previous customer may be determined 610. The real-time communication address 128 may then be used to establish 612 real-time communication with the previous customer.

FIG. 7 illustrates a method 700 for enrolling customers in a real-time inquiry program. In accordance with the method 700, it may be determined 702 that a product (e.g., electronic media content) has been consumed by a customer. In response, the customer may be prompted 704 for input regarding participation in the real-time inquiry program.

If the customer responds by indicating that he/she does want to participate in the real-time inquiry program, then the customer may be prompted 706 for relevant customer information 312, such as a real-time communication address through which the customer may be reached. The information 312 that is collected may then be sent 708 to a real-time inquiry server system 322, which may create an association between the customer information 312 and the product. For example, the customer may be added to a list 204 of participating previous customers.

FIG. 8 illustrates another method 800 for enrolling customers in a real-time inquiry program. In accordance with the method 800, customer accounts associated with an online store may be monitored 802.

At some point, it may be determined 804 that a threshold amount of time has passed since a product was purchased. In response, the customer may be contacted and offered 806 the opportunity to participate in the real-time inquiry program.

If the customer decides that he/she wants to participate in the real-time inquiry program, then relevant customer information 312 (such as a real-time communication address 128) may be received 808 from the customer. An association may then be created 810 between the customer information 312 that is received and the product.

Figure 9:
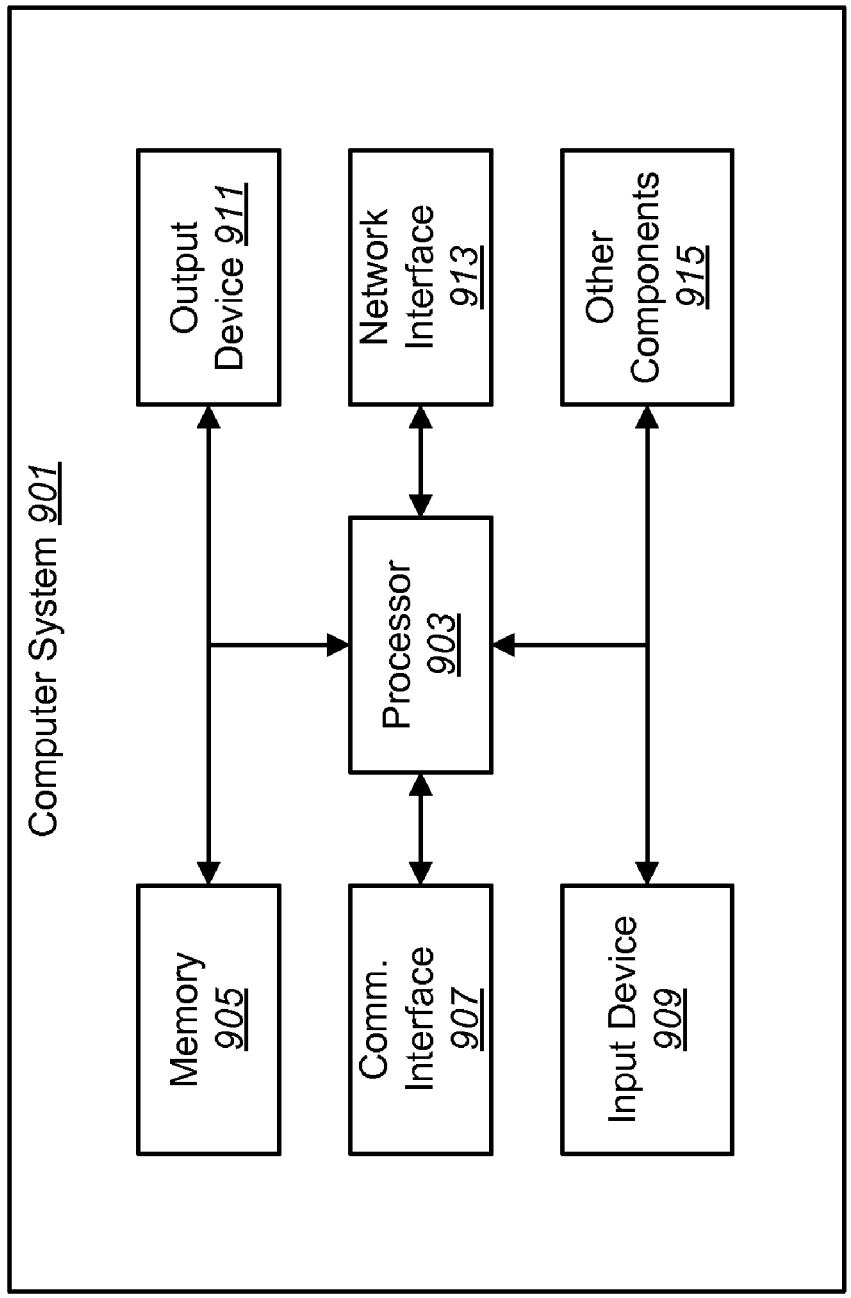
FIG. 9 illustrates various components that may be utilized in a computer system.

FIG. 9 illustrates various components that may be utilized in a computer system 901. One or more computer systems 901 may be used to implement the various systems and methods disclosed herein. The illustrated components may be located within the same physical structure or in separate housings or structures. Thus, the term computer or computer system 901 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 901 is shown with a processor 903 and memory 905. The processor 903 may control the operation of the computer system 901 and may be embodied as a microprocessor, a microcontroller, a digital signal processor (DSP) or other device known in the art. The processor 903 typically performs logical and arithmetic operations based on program instructions stored within the memory 905. The instructions in the memory 905 may be executable to implement the methods described herein.

The computer system 901 may also include one or more communication interfaces 907 and/or network interfaces 913 for communicating with other electronic devices. The communication interface(s) 907 and the network interface(s) 913 may be based on wired communication technology, wireless communication technology, or both.

The computer system 901 may also include one or more input devices 909 and one or more output devices 911. The input devices 909 and output devices 911 may facilitate user input. Other components 915 may also be provided as part of the computer system 901.

FIG. 9 illustrates only one possible configuration of a computer system 901. Various other architectures and components may be utilized.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), high definition DVD, floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for facilitating real-time product inquiries during online shopping, comprising:
   receiving, by a computing device, a request from a potential buyer device for real-time inquiry about a product;
   identifying, by the computing device, a previous customer of the product who has enrolled to participate in a real-time inquiry program;
   determining that the previous customer has agreed to answering questions about the product during a commitment period;
   determining that the commitment period for which the previous customer has agreed to answering questions about the product has not expired, the previous customer being unavailable to answer questions about the product after expiration of the commitment period; and
   establishing real-time communication between a device of the previous customer and the potential buyer device.

2. The method of claim 1, further comprising determining that the previous customer is online.

3. The method of claim 1, further comprising displaying statistics about how many previous customers are available for real-time communication.

4. The method of claim 1, further comprising:
   determining that the product has been used by the previous customer; and
   at least partly in response, prompting for input from the device of the previous customer regarding participation in the real-time inquiry program.

5. The method of claim 1, further comprising:
   determining that a threshold amount of time has passed since the product was purchased by the previous customer; and
   contacting the device of the previous customer regarding participation in the real-time inquiry program.

6. The method of claim 1, further comprising providing rewards for customer participation in the real-time inquiry program.

7. The method of claim 1, wherein establishing real-time communication comprises communicating with a communication bridge that bridges communication between a real-time communication application of the potential buyer device and a real-time communication application of the device of the previous customer.

8. A computer system that is configured to facilitate real-time product inquiries during online shopping, the computer system comprising:
   a processor;
   memory in electronic communication with the processor;
   instructions stored in the memory, the instructions being executable to:
      receive a request from a potential buyer device for real-time inquiry about a product;
      identify a previous customer of the product who has enrolled to participate in a real-time inquiry program;
      determine that the previous customer has agreed to answering questions about the product during a commitment period;
      determine that the commitment period for which the previous customer has agreed to answering questions about the product has not expired, the previous customer being unavailable to answer questions about the product after expiration of the commitment period; and
      establish real-time communication between a device of the previous customer and the potential buyer device.

9. The computer system of claim 8, wherein the instructions are also executable to determine that the previous customer is online.

10. The computer system of claim 8, wherein the instructions are also executable to display statistics about how many previous customers are available for real-time communication.

11. The computer system of claim 8, wherein the instructions are also executable to:
    determine that the product has been used by the previous customer; and
    at least partly in response, prompt for input from the device of the previous customer regarding participation in the real-time inquiry program.

12. The computer system of claim 8, wherein the instructions are also executable to:
    determine that a threshold amount of time has passed since the product was purchased by the previous customer; and
    contact the device of the previous customer regarding participation in the real-time inquiry program.

13. The computer system of claim 8, wherein the instructions are also executable to provide rewards for customer participation in the real-time inquiry program.

14. The computer system of claim 8, wherein establishing real-time communication comprises communicating with a communication bridge that bridges communication between a real-time communication application of the potential buyer device and a real-time communication application of the device of the previous customer.

15. A non-transitory computer-readable medium, storing computer-executable instructions that, when executed on one or more processors, cause the one or more processors to perform acts comprising:
    receiving a request for real-time inquiry about a product available for purchase from an online merchant;
    identifying a previous customer who has enrolled to participate in a real-time inquiry program;
    determining that the previous customer has agreed to answering questions about the product during a commitment period as part of the real-time inquiry program;
    determining that the commitment period for which the previous customer has agreed to answering questions about the product has not expired, the previous customer being unavailable to answer questions about the product after expiration of the commitment period; and
    establishing real-time communication with a device of the previous customer.

16. The computer-readable medium of claim 15, the acts further comprising determining that the previous customer is online.

17. The computer-readable medium of claim 15, the acts further comprising displaying statistics about how many previous customers are available for real-time communication.

18. The computer-readable medium of claim 15, the acts further comprising:
    determining that the product has been used by the previous customer; and
    in response, prompting for input from the previous customer regarding participation in the real-time inquiry program.

19. The computer-readable medium of claim 15, the acts further comprising:
   determining that a threshold amount of time has passed since the product was purchased by the previous customer; and
   contacting the previous customer regarding participation in the real-time inquiry program.

20. The computer-readable medium of claim 15, the acts further comprising providing rewards for customer participation in the real-time inquiry program.

21. The computer-readable medium of claim 15, wherein establishing real-time communication with the device of the previous customer comprises connecting with the device of the previous customer via a communication bridge.

22. A computer system that is configured to facilitate real-time product inquiries during online shopping, the computer system comprising:
   one or more processors; and
   memory, storing computer-readable instructions that, when executed by the one or more processors, cause the one or more processors to perform acts comprising:
      receiving a request from a potential buyer device for real-time inquiry about a product;
      identifying a previous customer who has enrolled to participate in a real-time inquiry program;
      determining that the previous customer has agreed to be enrolled in the real-time inquiry program for a commitment period, the previous customer being unavailable to answer questions about the product after expiration of the commitment period; and
      establishing real-time communication between a device of the previous customer and the potential buyer device.

23. The computer system of claim 22, the acts further comprising determining that the device of the previous customer is online.

24. The computer system of claim 22, the acts further comprising displaying statistics about how many previous customer are available for real-time communication.

25. The computer system of claim 22, the acts further comprising:
   determining that the product has been used by the previous customer; and
   prompting for input from the previous customer regarding participation in the real-time inquiry program.

26. The computer system of claim 22, the acts further comprising:
   determining that a threshold amount of time has passed since the product was purchased by the previous customer; and
   contacting the device of the previous customer regarding participation in the real-time inquiry program.

27. The computer system of claim 22, the acts further comprising providing rewards for customer participation in the real-time inquiry program.

28. The computer system of claim 22, wherein establishing real-time communication comprises communicating with a communication bridge that bridges communication between a real-time communication application on the potential buyer device and a real-time communication application used by the device of the previous customer.

* * * * *